(12) United States Patent
Packer et al.

(10) Patent No.: US 10,074,097 B2
(45) Date of Patent: Sep. 11, 2018

(54) CLASSIFICATION ENGINE FOR CLASSIFYING BUSINESSES BASED ON POWER CONSUMPTION

(71) Applicant: Opower, Inc., Arlington, VA (US)

(72) Inventors: Benjamin Packer, Palo Alto, CA (US); Erik Shilts, San Francisco, CA (US); Madhanmohan Raju, San Francisco, CA (US); Natalie Musick, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 657 days.

(21) Appl. No.: 14/698,609

(22) Filed: Apr. 28, 2015

(65) Prior Publication Data

US 2016/0224994 A1    Aug. 4, 2016

Related U.S. Application Data

(60) Provisional application No. 62/111,511, filed on Feb. 3, 2015.

(51) Int. Cl.
*G06Q 30/02* (2012.01)
*G06G 1/00* (2006.01)
*G06F 17/30* (2006.01)

(52) U.S. Cl.
CPC ... *G06Q 30/0201* (2013.01); *G06F 17/30705* (2013.01)

(58) Field of Classification Search
CPC ............... G06Q 30/0201; G06G 17/30705
See application file for complete search history.

(56) References Cited

U.S. PATENT DOCUMENTS

| 4,334,275 A | 6/1982 | Levine |
| 4,843,575 A | 6/1989 | Crane |

(Continued)

FOREIGN PATENT DOCUMENTS

| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Sujay Koneru
(74) *Attorney, Agent, or Firm* — Cooper Legal Group, LLC

(57) ABSTRACT

Aspects of the subject technology relate to methods and systems for classifying businesses based on various types of information, such as resource consumption information. In some implementations, methods of the subject technology include steps for receiving a plurality of business categories, wherein each of the business categories is associated with at least one category profile, and receiving business information for an unclassified business, wherein the business information comprises behavioral attribute information corresponding with the unclassified business. In some implementations, the methods disclosed herein can further include steps for comparing the business information to one or more of the category profiles to determine if the unclassified business should be associated with at least one of the plurality of business categories.

14 Claims, 5 Drawing Sheets

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,148,289 A * | 11/2000 | Virdy ............... G06F 17/30616 705/1.1 |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| 8,571,909 B2 * | 10/2013 | Miller ................... G06Q 10/00 703/1 |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| 8,983,673 B2 * | 3/2015 | Chow ...................... H02J 3/14 700/297 |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 9,177,323 B2 * | 11/2015 | Forbes, Jr. ............. G06Q 10/00 |
| 9,678,527 B2 * | 6/2017 | Hjelm ....................... H02J 3/14 |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018571 A1 | 1/2003 | Dull et al. |
| 2003/0023467 A1 | 1/2003 | Moldovan |
| 2003/0120370 A1 * | 6/2003 | Kitayama ............... H02J 3/008 700/100 |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2004/0215536 A1 * | 10/2004 | Deliwala ................ G06Q 10/10 705/34 |
| 2005/0257540 A1 | 11/2005 | Choi et al. |
| 2006/0059151 A1 * | 3/2006 | Martinez ........... G06F 17/30699 |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0154810 A1 * | 6/2008 | Ye ............................ G06N 3/126 706/13 |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 * | 12/2008 | Murray ................... G06Q 10/10 |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |

(56) References Cited

U.S. PATENT DOCUMENTS

| | | |
|---|---|---|
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0106584 A1* | 5/2011 | Borthwick ............ G06Q 30/02 705/7.31 |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0096142 A1* | 4/2012 | Suit ............ H04L 67/22 709/224 |
| 2012/0179692 A1 | 7/2012 | Hsiao et al. |
| 2012/0185104 A1* | 7/2012 | Unver ............ G06Q 10/06313 700/291 |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0271669 A1* | 10/2012 | Taper ............ G06Q 10/06 705/7.11 |
| 2012/0290230 A1 | 11/2012 | Berges Gonzalez et al. |
| 2012/0310708 A1 | 12/2012 | Curtis et al. |
| 2013/0013345 A1* | 1/2013 | Wallquist ............ G06Q 10/0635 705/4 |
| 2013/0060531 A1 | 3/2013 | Burke et al. |
| 2013/0060720 A1 | 3/2013 | Burke |
| 2013/0080210 A1* | 3/2013 | Vogel ............ G06Q 10/06 705/7.33 |
| 2013/0097177 A1 | 4/2013 | Fan et al. |
| 2013/0097481 A1 | 4/2013 | Kotler et al. |
| 2013/0144575 A1* | 6/2013 | Seyhan ............ G06F 17/5009 703/2 |
| 2013/0166081 A1* | 6/2013 | Sanders ............ G05B 11/01 700/286 |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0280014 A1* | 9/2014 | Komissarchik ............ G06Q 10/06 707/710 |
| 2014/0337107 A1* | 11/2014 | Foster ............ G06Q 10/06395 705/7.41 |
| 2015/0120073 A1* | 4/2015 | Ghosh ............ G06Q 50/06 700/291 |
| 2015/0127455 A1* | 5/2015 | Penzotti ............ G06Q 30/0251 705/14.49 |
| 2015/0170160 A1* | 6/2015 | Burkhardt ............ G06Q 30/0201 705/7.29 |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0300831 A1 | 10/2015 | Sernicola |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0319119 A1 | 11/2015 | Ryu et al. |
| 2015/0324819 A1* | 11/2015 | Lin ............ G06Q 30/0204 705/7.33 |
| 2015/0326679 A1 | 11/2015 | Lin et al. |
| 2016/0012541 A1* | 1/2016 | Harrington ............ G06Q 40/08 705/4 |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.

(56) References Cited

OTHER PUBLICATIONS

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19, 2008, 15 pages, available at http://web.archive.org/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

D'Urso, M., et al., "A Simple Strategy for Life Signs Detection via an X-Band Experimental Set-Up," Progress in Electromagnectics Research C, vol. 9, pp. 119-129 (2009).

Eckmann, J.P., et al., "Ergodic theory of chaos and strange attractors," Reviews of Modern Physics, vol. 57, No. 3, Part I, pp. 617-656, Jul. 1985.

Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.

Fels, Margaret F., "PRISM: An Introduction," Elsevier Sequoia, Energy and Buildings, vol. 9, pp. 5-18, 1986.

Fels, Margaret F., et al., Seasonality of Non-heating Consumption and Its effect on PRISM Results, Elsevier Sequoia, Energy and Buildings, vol. 9, pp. 139-148, 1986.

Figueiredo, Vera, et al., "An Electric Energy Consumer Characterization Framework Based on Data Mining Techniques," IEEE Transactions on Power Systems, vol. 20, No. 2, pp. 596-602, May 2005.

Fitbit® Official Site, "Flex, One & Zip Wireless Activity & Sleep Trackers," http://www.fitbit.com/, 4 pages, Jul. 15, 2013.

Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.

Friedman, Jerome, et al., "Regularization Paths for Generalized Linear Models via Coordinate Descent," Journal of Statistical Sotfware, vol. 33, Iss. 1, pp. 1-22, Jan. 2010.

Gelber, Bob, "This Is Not a Bill," posted at Not a Mystery, posting date 4/1812015, available at http://notamystery.com/2015/04/18/not_worth_the_papeUts_printed_on/>.

Goldberg, Miriam L., et al., "Refraction of PRISM Results into Components of Saved Energy," Elsevier Sequoia, Energy and Buildings, vol. 9, pp. 169-180, 1986.

Jansen, R.C., "Maximum Likelihood in a Generalized Linear Finite Mixture Model by Using the EM Algorithm," Biometrics, vol. 49, pp. 227-231, Mar. 1993.

Jawbone, "Know yourself. Live better." http://jawbone.com/up/, 7 pages, Jul. 15, 2013.

Karsten, "Green nudge: The classic social comparison experiment by Opower," posted at iNudgeyou, posting date Nov. 28, 2012, available at http://inudgeyou.com/greennudgetheclassicsocialcomparisonexperimentbyopower/>.

Laskey, Alex, et al., "OPOWER," posted at ACM, posting date Jun. 2011, Copyright © 2015 by the ACM, available at http://xrds.acm.org/article.cfm?aid=1961687>.

Leisch, Friedrich, "FlexMix: A General Framework for Finite Mixture Models and Latent Class Regression in R," Journal of Statistical Software, http://www.istatsoft.org/, vol. 11 (8), pp. 1-18, Oct. 2004.

Liang, Jian, et al. "Load Signature Study-Part II: Disaggregation Framework, Simulation, and Applications," IEEE Transactions on Power Delivery, vol. 25, No. 2, pp. 561-569, Apr. 2010.

Liang, Jian, et al., "Load Signature Study-Part I: Basic Concept, Structure, and Methodology," IEEE Transactions on Power Delivery, vol. 25, No. 2, pp. 551-560, Apr. 2010.

Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.

Mint.com, "Budgets you'll actually stick to," Budgeting—Calculate and Categorize your spending, https://www.mint.com/how-it-works/budgeting/, 2 pages, Jul. 12, 2013.

Mint.com, "We're always on alert." Alerts for bills, fees & going over budget, https://www.mint.com/how-it-works/alerts/, 2 pages, Jul. 12, 2013.

Morabito, Kerri, "High User Campaign," posted at Kerri Morabito, posting date not given, © Kerri Morabito, 2015, available at <URL: http://www.kerrimorabito.com/high-user-campaign.html>.

Mori, Hiroyuki, "State-of-the-Art Overview on Data Mining in Power Systems," IEEE, pp. 33-37, 2006.

Muthen, Bengt, et al., Finite Mixture Modeling with Mixture Outcomes Using the EM Algorithm, Biometrics, vol. 55, pp. 463-469, Jun. 1999.

Nest, "The Learning Thermostat," http://www.nest.com/, 2 pages, Jul. 15, 2013.

Nike.com, "Nike + FuelBand. Tracks your all-day activity and helps you do more . . . ," http://www.nike.com/us/en_us/c/nikeplus-f.. uelband._7 pages, Jul. 15, 2013.

Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiconsets/>.

Rose, O. "Estimation of the Hurst Parameter of Long-Range Dependent Time Series," University of Wuirzburg, Institute of Computer Science, Research Report Series, Report No. 137, 15 pages, Feb. 1996.

Sawka, Michael N., et al., "Human Adaptations to Heat and Cold Stress," RTOMP-076, 16 pages, Oct. 2001.

Stephen, Bruce, et al. "Domestic Load Characterization Through Smart Meter Advance Stratification," IEEE Transactions on Smart Grid, Power Engineering Letter, vol. 3, no. 3, pp. 1571-1572, Sep. 2012.

Stoop, R., et al., "Calculation of Lyapunov exponents avoiding spurious elements," Physica D 50, pp. 89-94, May 1991.

Wang, Xiaozhe, et al. "Rule induction for forecasting method selection: meta-learning the characteristics of univariate time series," Faculty of information Technology, Department of Econometrics and Business Statistics, Monash University, pp. 1-34.

Wang, Xiaozhe, et al., "Characteristic-Based Clustering for Time Series Data," Data Mining and Knowledge Discovery, Springer Science & Business Media, LLC, vol. 13, pp. 335-364 (2006).

Wehrens, Ron, et al. "Self- and Super-organizing Maps in R: The kohonen Package," Journal of Statistical Software, vol. 21, Iss. 5, pp. 1-19, Oct. 2007.

(56) References Cited

OTHER PUBLICATIONS

Wikipedia, "Akaike information criterion," 6 pages, Aug. 17, 2012.
Wikipedia, "Mixture model," 10 pages, Oct. 7, 2012.

* cited by examiner

CLASSIFICATION ENGINE FOR CLASSIFYING BUSINESSES BASED ON POWER CONSUMPTION

CROSS-REFERENCE TO RELATED APPLICATIONS

This application claims the benefit of priority to U.S. Provisional Application Ser. No. 62/111,511, filed Feb. 3, 2015, entitled "CLASSIFYING BUSINESSES," which is hereby incorporated by reference in its entirety.

BACKGROUND

Technical Field

Aspects of this disclosure relate to methods and systems for predicting business classifications for various establishment types, and in particular, for performing business category assignments based on physical attribute information and/or behavioral attribute information for a target business.

Introduction

Many types of service providers and vendors could benefit from knowing business-type classifications for a given business establishment. Such information could help utility providers improve advertising relevance or deliver other relevant information to business customers. In a similar manner, behavioral demand response (BDR) notification systems may be enhanced by improving notification content relevance, e.g., as between two or more similar business establishments, such as those engaged in the sale of similar goods or services.

SUMMARY

The following presents a simplified summary of one or more embodiments in order to provide a basic understanding of such embodiments. This summary is not an extensive overview of all contemplated embodiments, and is therefore not intended to identify key or critical elements of all embodiments nor delineate the scope of any or all aspects of the invention. Its sole purpose is to present some concepts of one or more embodiments in a simplified form as a prelude to a more detailed description, presented later.

Some aspects of the subject technology relate to a computer-implemented method including steps for receiving a plurality of business categories, wherein each of the business categories are associated with at least one category profile, and receiving business information for an unclassified business, wherein the business information comprises one or more of physical attribute information or behavioral attribute information corresponding with the unclassified business. In some aspects, the method can include additional steps, including, comparing the business information to one or more of the category profiles to determine if the unclassified business should be associated with at least one of the plurality of business categories.

In another aspect, the subject technology relates to a business classification system, including one or more processors, and a computer-readable medium having instructions stored therein, that when executed by the processors, cause the processors to perform operations including, receiving a plurality of business categories, wherein each of the business categories is associated with at least one category profile, and receiving business information for an unclassified business, wherein the business information comprises behavioral attribute information corresponding with the unclassified business. In certain aspects, the processors can be further configured to execute operations for comparing the business information to one or more of the category profiles to determine if the unclassified business should be associated with at least one of the plurality of business categories.

In yet another aspect, the subject technology can relate to a non-transitory computer-readable storage medium including instructions for receiving a plurality of business categories, wherein each of the business categories is associated with at least one category profile, and receiving business information for an unclassified business, wherein the business information comprises physical attribute information corresponding with the unclassified business. In some aspects, the instructions can further include comparing the business information to one or more of the category profiles to determine if the unclassified business should be associated with at least one of the plurality of business categories.

BRIEF DESCRIPTION OF THE DRAWINGS

In the following description, reference is made to the following figures, and in which are shown by way of illustration specific examples in which the subject technology may be practiced. It is understood that other aspects may be utilized and changes made without departing from the scope of the subject technology. In the figures.

DETAILED DESCRIPTION

Figure 1A:
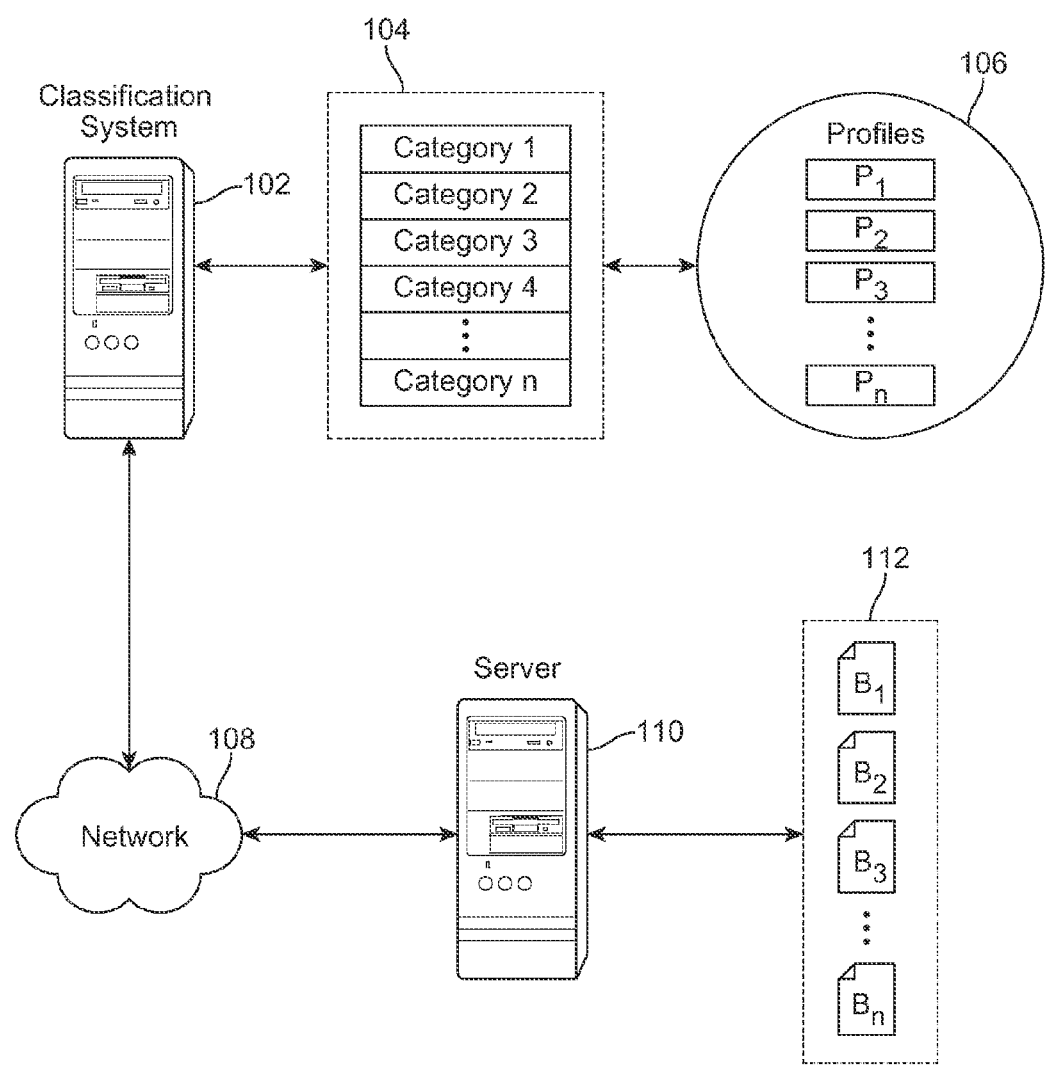
FIG. 1A illustrates an example environment that can be used to implement a business category classification method, according to some aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Aspects of the subject technology address the foregoing need by providing methods and systems for classifying businesses according to a business-type classification. As used herein, a "business-type classification" or "business classification" can include any label or indicator that can be used to identify a business type, such as a characterization of products or services provided by an associated business entity. Business classifications can be performed using any information available for a particular business, including information relating to physical attributes (e.g., physical attribute information) and/or behavioral attributes (e.g., behavioral attribute information).

As discussed in further detail below, physical attribute information can include any information/data indicating static properties or qualities of a business. Physical attributes can include, but are not limited to: location information, square footage, and/or zoning restriction classifications, etc. In contrast, behavioral attribute information can include any information or data relating to business practices or behaviors relating to a manner in which an establishment conducts its business. Behavioral attribute information can include, but is not limited to: resource consumption information or resource usage patterns, business name, open hours information, product name/s, and/or advertising information, etc.

Business classification categories can be created based on business information for which an associated classification is already known. Various business classification categories can be distinguished by associated profiles, e.g., "category profiles" that serve to identify particular information or patterns relevant to the business classification. That is, through the association of physical/behavioral attribute information, various category profiles can be used to distinguish between business categories, and then (later) used to identify businesses of unknown type.

In practice, category profiles can include labels or tags (e.g., metadata) to indicate a particular class of offered products and/or services. By way of example, category profiles can include information relating to a generalized business category, such as a "restaurant," "retail store," or "bank," etc. Category profiles can also include tags or information to identify an establishment with greater specificity, such as by indicating specific products or services offered, such as "pizza parlor," "clothing store," or "mortgage bank," etc.

Once a set of category profiles have been established for one or more business categories, business information (e.g., for a business of an unknown type) can be compared with the category profiles to determine if the business should be associated with the corresponding business category. In some aspects, a degree of similarity, as between business information for an unclassified target business and a category profile for a particular business category may be used to determine if a classification (e.g., an association between business information and business category) is warranted.

In some implementations, classification of a business into one or more business categories can be performed using a clustering algorithm, for example, that is implemented with a machine-learning approach. Once a given business-classification category assignment is made, subsequent processing can be performed to determine if the classification was correctly made. Correct classifications can further reinforce a current category assignment scheme. Similarly, identified incorrect classifications can cause the update/change of the classification scheme, for example, to decrease a likelihood of subsequent classification errors.

FIG. 1A illustrates an example environment 100 that can be used to implement a business category classification method. Environment 100 includes classification system 102 that is configured to determine business category classification assignments for unclassified businesses based on an analysis of corresponding business information. In the example of environment 100, classification system 102 includes category database 104 that contains multiple business-type categories (i.e., Category 1 . . . Category N). In turn, each business-type category in category database 104 is associated with one or more category profiles (e.g., profiles 106) that can be used to identify/define the associated business category. As discussed in further detail below, each category profile can be exclusive to a singular business category, or alternatively, category profiles may be shared by one or more business categories. In the example of FIG. 1A, each of the category profiles (e.g., $P_1 \ldots P_n$) are stored in profile database 106. However, it is understood the associations between a particular category (e.g., Category 1), and one or more profiles (e.g., $P_1$ and $P_2$) may be accomplished using other data structures or methods, such as pointers, linked lists, arrays and/or function calls, etc.

As further illustrated in example environment 100, classification system 102 is coupled to server 110, e.g., via network 108. It is understood that network 108 can represent any type of communication network, including any combination of private networks, such as local area networks (LANs), wide-area networks (WANs), WiFi network, cellular network or a network of networks, such as the Internet.

Server 110 includes a business information database 112 configured to store business information for one or more unclassified businesses. In the illustrated example, database 112 includes business information for multiple businesses (e.g., $B_1, B_2, B_3 \ldots B_n$). It is understood that business information for any number of unclassified businesses may be accessible by server 110 and stored either locally or remotely. It is further understood that server 110 represents potentially any source of business information that is provided to classification system 102. As such, server 110 may also represent one or more third party systems or proprietary data stores capable of providing business information to classification system 102 via a network, such as network 108. By way of example, server 110 may represent a data collection network that retrieves information from various online sources, such as business directories, review websites, map providers, and/or rebate websites, etc.

In practice, business information for unclassified businesses (i.e., business establishments for which a business type is unknown) is provided to classification system 102, for example, by server 110, via network 108. Business information can be collected or aggregated from one or more sources, such as a resource provider (e.g., a power utility) or from one or more third-party services providing demographic data. In some implementations, business information can be provided directly to classification system 102, or alternatively, to an intermediary processing system, such as that represented by server 110, as discussed in further detail below. As illustrated in the example of FIG. 1A, business information for each individual business entity can be segregated into discreet files (e.g., $B_1, B_2, B_3 \ldots B_n$) and/or separated using metadata tags. As discussed above, business information can contain any information or data pertaining to a particular business, such as physical attribute information and/or behavioral attribute information, as described above.

In one example approach, business information $B_1$ includes physical and/or behavioral attribute information for a first business, whereas business information $B_2$ includes physical and/or behavioral attribute information for a second business. The type of physical or behavioral attribute information for each business stored in database 112 can be different. For example, only physical attribute information, such as a business location or address, may be available for the first business. In contrast, location information and behavioral attribute information (e.g., power consumption data) may be available for the second business.

Once the business information for an unclassified business is provided to classification system 102, classification system 102 can use existing category profiles (e.g., category profiles $P_1 \ldots P_n$) to determine if a business category assignment should be made for the unclassified business. Similarity between the received business information and one or more category profiles can be determined by comparing the business information to the category profiles. Where it is determined that a high degree of similarity exists between business information for an unclassified business and a particular category profile, an association is created between the corresponding business category and the unclassified business. In some implementations, this association or classification is accomplished by editing or appending the business information to include a metadata reference to a particular business category.

By way of example, business information $B_1$ for an unclassified first business may be determined to be highly similar to profile information contained in category profile $P_1$, associated with Category 1, from among the business categories in category database 104. As discussed above, $B_1$ can include physical/behavioral attribute information used for comparison against various profiles for each of the business categories in category database 104. Further to the above example, category profile $P_1$ may be based on a cluster of physical/behavioral attribute information that correlates with late-night restaurant establishments. Thus, based on similarities between $B_1$ and $P_1$, the business corresponding with $B_1$ is associated with Category 1, which identifies $B_1$ as a late-night restaurant.

In the foregoing example, any type of information can be used to form a category profile with which the business information is compared. For example, $P_1$ can contain behavioral attribute information such as resource usage data (e.g., power data) that is collected by a utility provider, e.g., on a monthly basis, or alternatively that is collected by an advanced metering infrastructure (AMI) device for shorter time intervals (e.g., on a daily, hourly or minute-by-minute basis). Physical attribute information can also be used, for example, $P_1$ may include address location information for known restaurant locations, for example, that are collected/scraped from online advertising materials, third-party maps, and/or ratings services, etc. Thus, by comparing the available business information for business $B_1$ with various types of physical and behavioral attribute information stored in the various category profiles for business Category 1-N, category assignments can be made for the previously unclassified business associated with business information $B_1$.

Figure 1B:
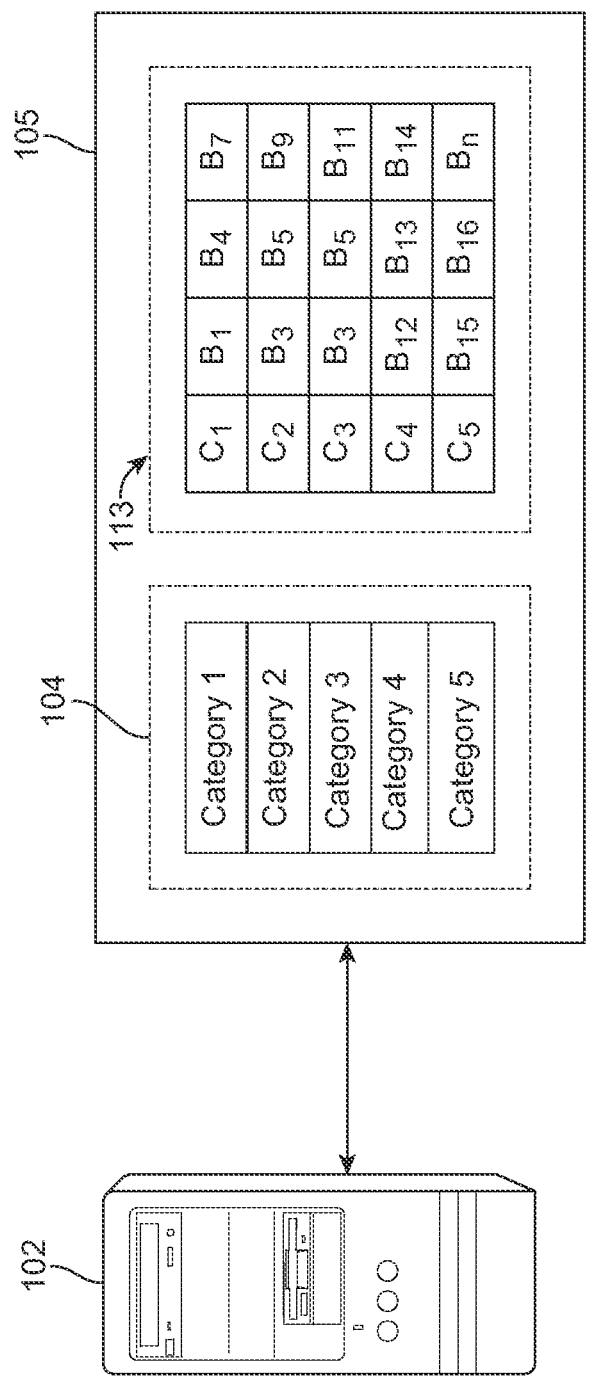
FIG. 1B conceptually illustrates an example of a classification system, including a classification database.

FIG. 1B conceptually illustrates an example of a classification system e.g., classification system 102, including a classification database 105. As illustrated, classification database 105 indicates relationships between business categories in category database 104, and business classifications 113 that have been formed with various sets of business information (e.g., $B_1 \ldots B_N$). Further to the above example, business classifications 113 are the result of the successful categorization (e.g., by classification system 102) of previously unclassified businesses. That is, business classifications 113 illustrate a relationship between a particular category tag (e.g., $C_1 \ldots C_5$) and businesses corresponding with business information $B_1 \ldots B_N$. As indicated in the illustrated example, businesses associated with business information $B_1$, $B_4$ and $B_7$ are each associated with Category 1 or "$C_1$." Businesses associated with business information $B_3$, $B_5$, and $B_9$ are each associated with Category 2 or "$C_2$." Businesses associated with business information $B_3$, $B_5$, and $B_{11}$ are each associated with Category 3 or "$C_3$." Finally, business information $B_{15}$, $B_{16}$, and $B_N$ are each associated with Category 5 or ("$C_5$").

Although the example of FIG. 1B provides five classification categories, it is understood that classification system 102 can be used to classify and maintain relationships between virtually any number of businesses and business classifications. In some aspects, a business can be assigned to only one classification category. By way of example, a business associated with business information $B_1$ is only associated with Category 1 ("$C_1$"). However, in other implementations, a business may be associated with multiple classification categories. For example, the business associated with business information B3 is paired with multiple classification categories, i.e., Category 2 ("$C_2$") and Category 3 ("$C_3$").

Each category classification may correspond with a particular classification or description for a corresponding business. In some approaches, a business may be simultaneously associated with multiple business classifications. Further to the above example, Category 2 and Category 3 may respectively correspond with "restaurant" and "Italian" categories. Thus, Category 3 can effectively function as a subclass for Category 2, that is, a business assigned to both $C_2$ and $C_3$ (such as the business associated with $B_3$) may be classified as an Italian restaurant.

In another example, each business classification category may define a mutually exclusive business-type, such as "Restaurant," "Retail Establishment," or "Convenience Store." In the foregoing example, $C_4$ may correspond with a "Movie Theatre" classification, whereas $C_5$ corresponds with a "Gas Station" classification. Thus, a business associated with $C_4$ (e.g., $B_{12}$, $B_{13}$ and $B_{14}$) is not associated with $C_5$.

In some approaches, classifications that have been established for a given business may be updated, changed and/or augmented. For example, business information for a particular business provided to the classification system can trigger the additional association of one or more classifications to a particular business. In one illustrative example, a drinking establishment, for example, the "Chatsubo Bar" may be associated with the classifications: "bar," "pub," and "late-night establishment." However, subsequent business information indicating that food menu items are served by the Chatsubo Bar may result in the association of additional business categories such as: "restaurant," and "izakaya." Thus, additional business classification associations may be used to further refine a set of classification categories that are already associated with a business.

In other aspects, additional classification processing can be used to edit (or altogether remove) a previous business classification. For example, business information including behavioral attribute information, such as resource consumption data, can cause a particular business to be classified as a "late-night restaurant," i.e., because of a particular amount of power consumption during twilight hours. However, subsequently received physical attribute information, such as location information, may indicate that the associated establishment is a "hotel." As such, the "late-night restaurant" association is removed and a re-categorization is performed, for example to categorize the business as a "hotel." Further examples of the manner in which business information can be used to perform category classifications are provided with respect to FIG. 2.

Figure 2:
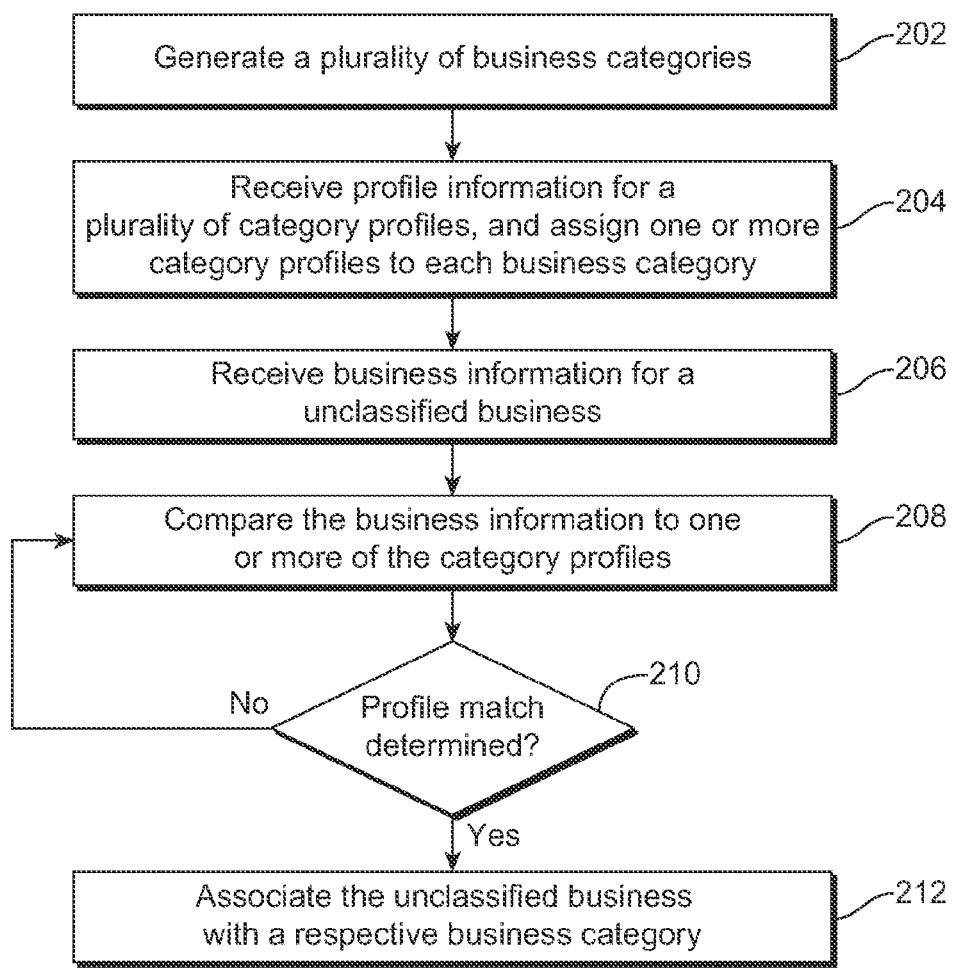
FIG. 2 illustrates an example process 200 that can be implemented to perform business category classifications, according to some aspects of the technology.

FIG. 2 illustrates an example process 200 that can be implemented to perform business category classifications, according to some aspects of the technology. Process 200 begins with step 202, when a plurality of business categories are generated or created. Business category generation can be performed using a classification system, such as classification system 102, discussed above. Alternatively, one or more business classifications may be generated and/or initialized on one or more third-party systems.

In practice, business categories can comprise labels or tags, such as metadata tags, that can be attached to, or associated with a particular business, for example, depending on the determined classification for that business. As discussed above with respect to FIG. 1B, a given business category can be associated with one or more businesses (e.g., business information of data corresponding with one or more businesses). Similar to the example provided by classification database 105, discussed above with respect to FIG. 1B, business category tags (e.g., $C_1 \ldots C_5$) can be used, e.g., by a storage database, to correlate one or more business classifications with business information for a given business.

In step 204, profile information for one or more category profiles is received and assigned to each business category. In some implementations, category profiles can determine the type of information or data characteristics/patterns used to define a particular business category. That is, category profiles provide information against which business information for an unclassified business can be compared to determine if the unclassified business should be associated with a corresponding category. As discussed in further detail below, category profiles can contain information relating to consumption patterns (e.g., electric energy usage patterns), and/or information relating to name or title patterns. By way of example, certain names or words may be more frequently used in conjunction with businesses of a particular type (such as the descriptive terms "Laundromat" and "Pharmacy"). Thus textual pattern information contained in various category profiles may be used to classify businesses based on textual or naming information supplied by their associated business information.

As discussed above with respect to the example provided by FIG. 1A, each business category may be associated with any number of category profiles. In some instances, different categories may be associated with a common category profile. By way of example, first and second business categories may each be associated with profiles containing data for identifying restaurants. However, the first business category can be exclusively associated with a profile containing data for identifying "Italian food," and the second business category exclusively associated with a profile containing for identifying "Indian food." As such, category profiles for the first business category can be used to identify "Italian restaurants," whereas category profiles for the second business category can be used to positively identify "Indian restaurants."

The creation and maintenance of category profiles can depend on the desired implementation. For example, in aspects wherein a machine learning approach is used, category profiles can be pre-determined by a training data set that is curated by one or more users or administrators. That is, initial category profile creation can depend on a variety of inputs and/or factors, such as neural-network weight initialization and structure, as well as the type of training data used to generate the category profiles.

By way of example, some category profiles can be created with a heavy reliance on a particular type of data, such as physical attribute data, whereas others may be generated based on other data or characteristics, such as behavioral attribute information. In yet another approach, category profiles may be based entirely on user-generated models, or approximations relating to a particular type of business information, such as resource consumption, advertising information, and/or location information, etc. By way of further example, user-generated models can include specific user determined data types or patterns that will be used to identify a particular business or product.

By way of further example, some business classification categories may be created with a heavy reliance on a particular type of data, such as physical attribute data, whereas others are generated based on other data or characteristics, such as behavioral attribute information. In yet another approach, business categories may be based entirely on user-generated models, or approximations relating to a particular type of business information, such as resource consumption, advertising information, business name and/or location information, etc.

In step 206, business information for an unclassified business is received, for example, by a classification system, such as classification system 102. The origin of the business information can depend on implementation. For example, business information (e.g., resource consumption information), can be received from a third-party provider such as a utility company. However, in some implementations, business information including one or both of behavioral attribute information and physical attribute information may be aggregated from multiple sources. Such sources may include one or more of: a business names, descriptive business titles, a utility provider, a business directory, online advertisements, and/or telephone directories.

In step 208, the business information is compared with one or more of the category profiles to determine if the business information is sufficiently similar to the category profile to warrant a corresponding business category association. The degree of similarity between a particular category profile and the supplied business information can depend on a variety of factors. That is, certain similarities (or differences) may be more greatly weighted when making a determination if business information is sufficiently similar to a given category profile, potentially indicating that a link with the corresponding business category should be established.

The supplied business information may include resource consumption information in the form of load curve data, i.e., power consumption data that is plotted against an independent time variable. Load curve data can be presented in a tabular or graphical form, and can depend on the time-resolution for which the corresponding consumption data is plotted. That is, load curve data can represent power consumption measurements taken on various time intervals, such as on a monthly, weekly, hourly or minute-to-minute basis. In some implementations, load curve data in the supplied business information can be compared to the category profile information, e.g., to determine if the load curve data is similar to a load curve archetype provided contained in the category profile. In some aspects, the supplied business information can include a business name or title (e.g., textual information) that can be compared with textual information and patterns represented by various category profiles. By way of example, category profiles may contain textual information or patterns, such as letter or name frequency heuristics, which can be used to identify a business category. That is, various category profiles can provide indications of frequently used names or textual patterns that are associated with businesses of a corresponding business type.

In some aspects, a degree of similarity between a set of business information and a category profile may be quantified. As such, certain quantifications of similarly exceeding a predetermined threshold can result in the association between the unclassified business and an associated business category. By way of example, when business information for an unclassified pizza delivery service is compared to a category profile for an "Italian restaurant," the quantity of similarity may be high (e.g., exceeding a predetermined threshold). For example, on a 1-10 scale of similarity, wherein a '10' indicates the highest-degree of similarity, a comparison of the delivery service to the category profile may return a score of '8.'

Subsequently, in step 210 it is determined if a profile match has been identified (e.g., as between a set of business information and a category profile). If no match is found, step 210 reverts to step 208, discussed above. Alternatively, if a positive match is identified, step 210 proceeds to step 212 in which classification associations are made.

As discussed above with respect to step 208, determinations of similarity between a set of business information and a particular category profile can be performed in different ways. In approaches that produce quantitative measures of similarity, profile matches can be identified if the computed quantity of similarity is above the predetermined threshold. Conversely, no associations may be formed if the determined quantity of similarly is below the predetermined threshold. Further to the example of step 208, if the threshold of similarity is a '7,' then a numeric similarity score of '8' would indicate a high enough degree of similarity (as between the business information and the category profile) that an association should be created. Also depending on implementation, predetermined similarity thresholds may set by a user or system administrator.

In step 212, associations are formed between a business (e.g., business information for a particular business) and a respective business category. Associations may be formed on the basis of a determined similarity between one or more category profiles (i.e., for a particular business category) and the business information. In some aspects, a business may be associated with a particular business category if a similarity is identified between any single category profile (of the business category) and the business information. Alternatively, associations may be formed if matches between the business information and a threshold number of category profiles are identified.

Formed business classifications (i.e., associations between a business/set of business information) can be stored in a memory of the classification system, e.g., in a database linking identifying information for a business (i.e., name, location or another unique identifier), with metadata tags or other descriptive classification information. By way of example, business classifications may be stored to a database, such as classification database 105, discussed above with respect to FIG. 1B.

Newly formed business classifications may be provided to one or more third parties, such as a resource provider or utility. In some aspects, a utility provider may use business classification information to enhance relevance of customer communications, for example, to provide notifications or incentives for use in advertising power conservation programs.

Business classifications may also be used to update or augment one or more databases of business information, for example, that are used to provide customer notifications such as targeted Behavioral Demand Response (BDR) notifications. By knowing business-type classifications, BDR notification delivery content relevance can be improved, for example, by increasing the accuracy of customer-to-customer comparisons. Additionally, business classification information may help to generally improve customer incentive communications, even where customer comparisons are not being made, for example, by improving customer segmentation and/or enhancing content relevance.

Figure 3:
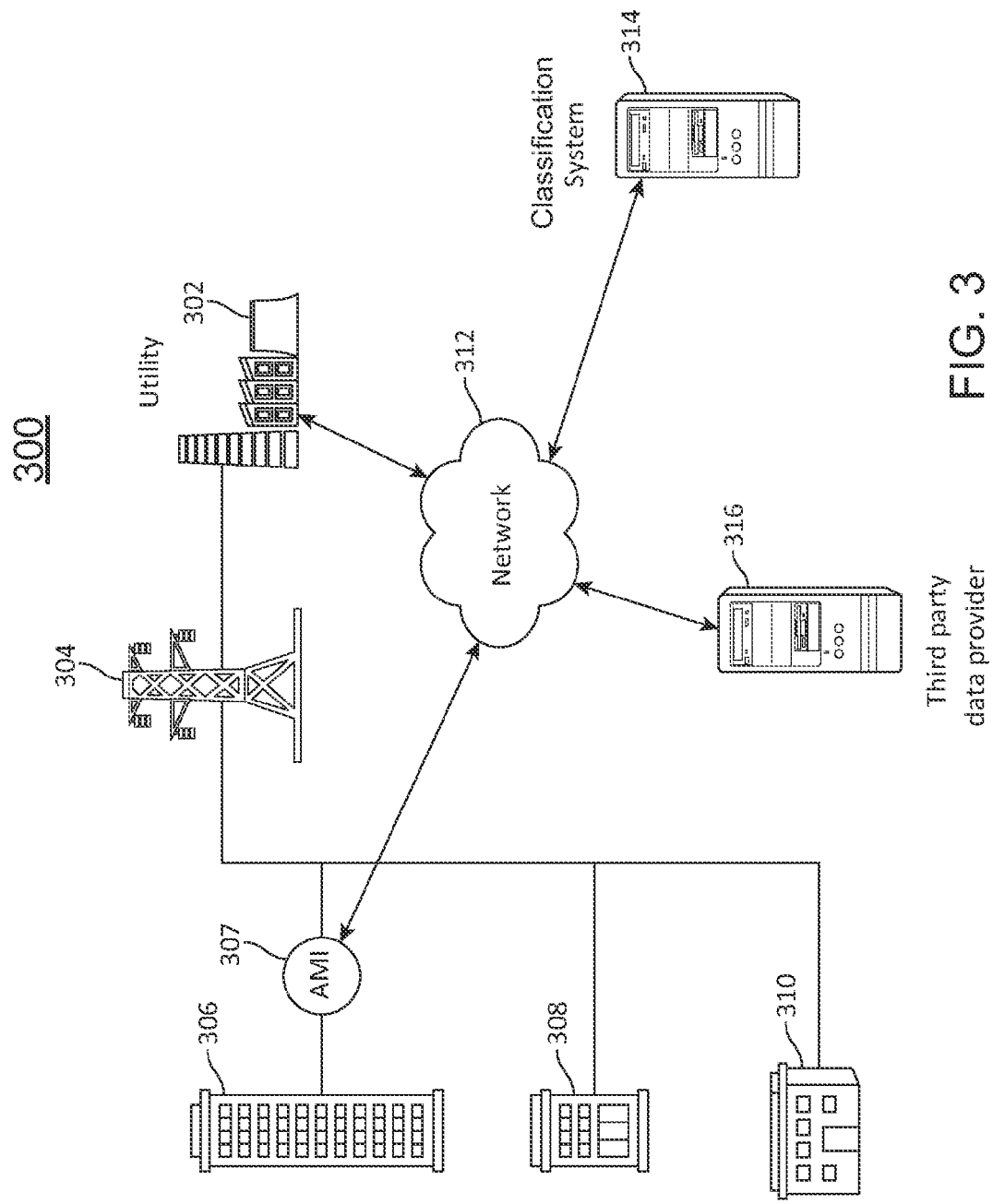
FIG. 3 illustrates an example system in which business information may be collected and provided to a classification system.

FIG. 3 illustrates an example system 300 in which business information can be collected and provided to a classification system (e.g., classification system 314) according to some aspects of the technology. System 300 includes a utility 302 that is communicatively connected to several business entities (e.g., businesses 306, 308, and 310) via power infrastructure 304. System 300 also includes a classification system 314, and a third-party data provider 316 that are communicatively coupled to one another, as well as utility 302, e.g., via network 312. Furthermore, network 312 is communicatively coupled to Advanced Metering Infrastructure (AMI) device 307. In the example of system 300, power infrastructure 304 includes various types of power delivery infrastructure. Similarly, network 312 can represent various communication networks, such as local area networks (LANs), wide area networks (WANs), or a network of networks, such as the Internet.

In practice, business information for each of businesses 306, 308 and 310 can be collected either directly by classification system 314, or via an intermediary collection step, such as by utility 302 or third party server 316. By way of example, utility 302 may collect/aggregate behavioral attribute information (such as power consumption data) pertaining to any (or all) of businesses 306, 306 and/or 310. Collected consumption information can be based on monthly power readings performed at a site of the respective business. In some aspects, more frequent readings may be taken using an advanced metering infrastructure (AMI) device, such as AMI 307, e.g., to take power consumption readings on a daily, hourly or minute-by-minute basis.

In certain aspects, business information pertaining to any of businesses 306, 308 and/or 310 may also be collected by a third party agency or service, such as third party data provider 316. In this example, third party data provider 316 represents any service or combination of services (including on or more servers, clusters or data collection networks) that can collect, host and/or provide various types of information, such as physical attribute information or behavioral attribute information about a business entity. By way of example, third party data provider 316 may include map services configured to identify a business geolocation on a map. Alternatively, third party data provider 316 may be a directory service that provides advertising information about a business including, but not limited to: open hours information, menu or product listings, business descriptions, ratings or reviews, demographic information, and/or other types of textual information.

In practice, business information received by classification system 314 can include a mixture of physical and/or behavioral attribute information that is received either directly, or via one or more intermediary parties, such as utility 302 and/or third party data provider 316. By way of example, business information for business 306 may be received by classification system 314 via both of utility 302 and third party data provider 316. For example, business information comprising behavioral attribute information can be provided by utility 302 that can include power consumption data, entity name, and mailing address. Similarly, physical attribute information including geolocation information, approximate size (e.g., square footage or operating area), can be provided by third party data provider 316. Once received by classification system 314, the business information can be used to determine one or more business category classifications for the associated business.

It is understood that system 300 is exemplifies one example of an environment in which aspects of the invention can be practiced; however, other configurations can be implemented without departing from the scope of the subject technology. For example, in other implementations, various numbers of consuming entities (e.g., businesses, residences, or industrial facilities) may be represented. Similarly, various numbers or other types of resource providers (such as a water or gas provider may be represented).

Figure 4:
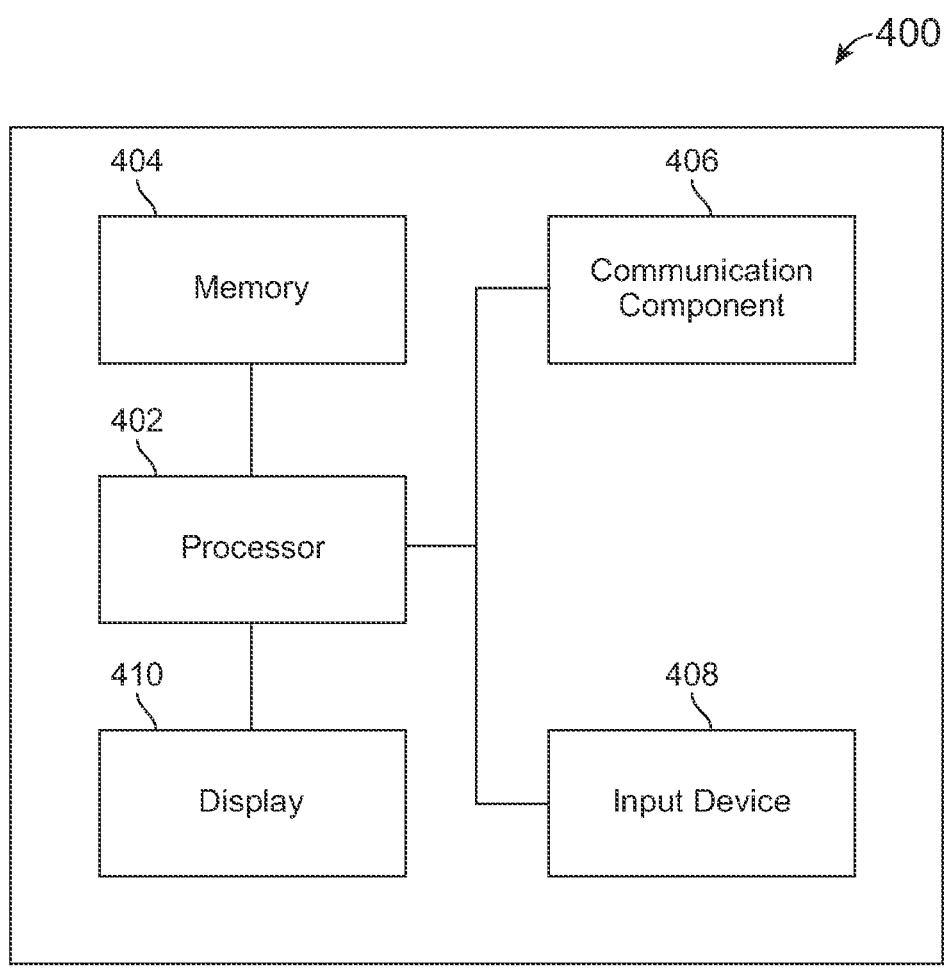
FIG. 4. illustrates a conceptual block diagram of hardware components that can be used to implement a business classification system, according to some aspects of the technology.

FIG. 4 illustrates an example configuration of components of computing device 400, which may be used to implement a classification system, as discussed above with respect to FIGS. 1-3. In this example, computing device 400 includes processor 402 for executing instructions stored in memory device or element 404. The instructions can cause computing device 400 to execute a computer-implemented method, for example, to associate business classification categories with one or more unclassified businesses.

As would be apparent to one of skill in the art, computing device 400 can include various types of memory, data storage, and/or non-transitory computer-readable storage media, such as a first data storage for program instructions for execution by the processor 402, a separate storage for usage history or user information, a removable memory for sharing information with other devices, etc. Computing device 400 can also include one or more communication components 406, such as a Wi-Fi, Bluetooth®, radio frequency, near-field communication, wired, and/or wireless communication systems, etc.

Computing device 400 can communicate with a network (e.g, network 312), such as the Internet, and can be configured to communicate with other such devices, such as one or more smart thermostat device, demand response devices, and/or AMI metering devices. Computing device 400 may include at least one input device 408 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Computing device 400 can also include a display element 410, such as a touch-screen or liquid crystal display (LCD).

The various aspects can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method comprising:
   receiving a plurality of business categories, wherein each of the business categories is associated with (i) at least one category profile and (ii) a set of electronic messages, wherein the set of electronic messages are maintained in a storage device;
   receiving business information for an unclassified business, wherein the business information comprises at least information describing power consumption of the unclassified business and a zoning restriction classification associated with a location at which the unclassified business operates;
   comparing the business information to one or more of the category profiles to determine if the unclassified business corresponds with at least one of the plurality of business categories based at least in part on the power consumption of the unclassified business,
   wherein for a first business category of the plurality of business categories, the comparing comprises:
      (i) determining a degree of similarity value describing a degree to which the business information matches information contained within the one or more of the category profiles associated with the first business category; and
      (ii) determining that the unclassified business corresponds with the first business category when the degree of similarity value exceeds a predetermined threshold;
   in response to determining that the unclassified business corresponds with the first business category, associating the unclassified business with the first business category, wherein a first subset of the set of electronic messages are maintained in the storage device in association with the first business category; and
   controlling transmission of the set of electronic messages based on associations between businesses and the business categories, comprising:
      (i) selecting the first subset of the set of electronic messages from the storage device for transmission to remote devices associated with the unclassified business based on the unclassified business being associated with the first business category; and
      (ii) sending the first subset of the set of electronic messages to the remote devices associated with the unclassified business.

2. The computer-implemented method of claim 1, wherein associating the unclassified business with the first business category comprises associating the unclassified business with the first business category by pairing metadata for the first business category with information identifying the unclassified business.

3. The computer-implemented method of claim 1, further comprising:
   updating at least one of the one or more of the category profiles associated with the first business category in response to receiving an indication that the unclassified business does not correspond with the first business category after associating the unclassified business with the first business category.

4. The computer-implemented method of claim 1, wherein the information describing power consumption comprises information describing a power usage pattern associated with the unclassified business.

5. The computer-implemented method of claim 1, wherein the business information further comprises a square footage associated with a building in which the unclassified business operates.

6. A business classification system comprising:
   one or more processors, and
   a computer-readable medium comprising instructions stored therein, which when executed by the one or more processors, causes the one or more processors to perform operations comprising:
      receiving a plurality of business categories, wherein each of the business categories is associated with (i) at least one category profile and (ii) a set of electronic messages, wherein the set of electronic messages are maintained in a storage device;
      receiving business information for an unclassified business, wherein the business information comprises at least information describing power consumption of the unclassified business and a zoning restriction classification associated with a location at which the unclassified business operates;
      comparing the business information to one or more of the category profiles to determine if the unclassified business corresponds with at least one of the plurality of business categories based at least in part on the power consumption of the unclassified business,
      wherein for a first business category of the plurality of business categories, the comparing comprises:

(i) determining a degree of similarity value describing a degree to which the business information matches information contained within the one or more of the category profiles associated with the first business category; and (ii) determining that the unclassified business corresponds with the first business category when the degree of similarity value exceeds a predetermined threshold;

in response to determining that the unclassified business corresponds with the first business category, associating the unclassified business with the first business category, wherein a first subset of the set of electronic messages are maintained in the storage device in association with the first business category; and controlling transmission of the set of electronic messages based on associations between businesses and the business categories, comprising:

(i) selecting the first subset of the set of electronic messages from the storage device for transmission to remote devices associated with the unclassified business based on the unclassified business being associated with the first business category; and (ii) sending the first subset of the set of electronic messages to the remote devices associated with the unclassified business.

7. The business classification system of claim 6, wherein the information describing power consumption comprises information describing a power usage pattern associated with the unclassified business.

8. The business classification system of claim 6, wherein associating the unclassified business with the first business category comprises associating the unclassified business with the first business category by pairing metadata for the first business category with information identifying the unclassified business.

9. The business classification system of claim 6, wherein the instructions, which when executed by the one or more processors, causes the one or more processors to perform further operations comprising:

updating at least one of the one or more of the category profiles associated with the first business category in response to receiving an indication that the unclassified business does not correspond with the first business category after associating the unclassified business with the first business category.

10. The business classification system of claim 6, wherein the business information further comprises a square footage associated with a building in which the unclassified business operates.

11. A non-transitory computer-readable storage medium comprising instructions stored therein, which when executed by one or more processors, cause the one or more processors to perform operations comprising:

receiving a plurality of business categories, wherein each of the business categories is associated with (i) at least one category profile and (ii) a set of electronic messages, wherein the set of electronic messages are maintained in a storage device;

receiving business information for an unclassified business, wherein the business information comprises at least information describing power consumption of the unclassified business and a zoning restriction classification associated with a location at which the unclassified business operates;

comparing the business information to one or more of the category profiles to determine if the unclassified business corresponds with at least one of the plurality of business categories based at least in part on the power consumption of the unclassified business, wherein for a first business category of the plurality of business categories, the comparing comprises:

(i) determining a degree of similarity value describing a degree to which the business information matches information contained within the one or more of the category profiles associated with the first business category; and (ii) determining that the unclassified business corresponds with the first business category when the degree of similarity value exceeds a predetermined threshold;

in response to determining that the unclassified business corresponds with the first business category, associating the unclassified business with the first business category, wherein a first subset of the set of electronic messages are maintained in the storage device in association with the first business category; and controlling transmission of the set of electronic messages based on associations between businesses and the business categories, comprising:

(i) selecting the first subset of the set of electronic messages from the storage device for transmission to remote devices associated with the unclassified business based on the unclassified business being associated with the first business category; and (ii) sending the first subset of the set of electronic messages to the remote devices associated with the unclassified business.

12. The non-transitory computer-readable storage medium of claim 11, wherein associating the unclassified business with the first business category comprises associating the unclassified business with the first business category by pairing metadata for the first business category with information identifying the unclassified business.

13. The non-transitory computer-readable storage medium of claim 11, wherein the instructions, which when executed by the one or more processors, cause the one or more processors to perform further operations comprising:

updating at least one of the one or more of the category profiles associated with the first business category in response to receiving an indication that the unclassified business do not correspond with the first business category after associating the unclassified business with the first business category.

14. The non-transitory computer-readable storage medium of claim 11, wherein the information describing power consumption comprises information describing a power usage pattern associated with the unclassified business.

* * * * *